United States Patent [19]

Sato

[11] Patent Number: 5,839,087
[45] Date of Patent: Nov. 17, 1998

[54] CURRENT POSITION CALCULATING SYSTEM FOR A VEHICLE HAVING A FUNCTION FOR CORRECTING A VEHICLE DIRECTION

[76] Inventor: Hiroyuki Sato, 203, Heim-Wakaba,3-13-13, Yamatohigashi, Yamato-shi, Kanagawa-ken, Japan, 242

[21] Appl. No.: 663,757

[22] Filed: Jun. 3, 1996

[30] Foreign Application Priority Data

Jun. 9, 1995 [JP] Japan ..................................... 7-143567

[51] Int. Cl.$^6$ .................................................. G01C 21/20
[52] U.S. Cl. ......................... 701/207; 701/208; 701/210; 701/217; 340/990; 340/995
[58] Field of Search .................................... 701/201, 207, 701/208, 209, 210, 213, 216, 217; 340/988, 990, 995

[56] References Cited

U.S. PATENT DOCUMENTS

| | | | |
|---|---|---|---|
| 5,046,011 | 9/1991 | Kakihara et al. ...................... | 701/209 |
| 5,155,688 | 10/1992 | Tanaka et al. ........................... | 364/454 |
| 5,283,743 | 2/1994 | Odagawa ................................. | 701/224 |
| 5,422,815 | 6/1995 | Hijikata .................................... | 701/208 |

FOREIGN PATENT DOCUMENTS

| | | | |
|---|---|---|---|
| 0 302 736 A1 | 8/1988 | European Pat. Off. ........ | G09B 29/10 |
| 0 391 647 A2 | 4/1990 | European Pat. Off. ........ | G01C 21/20 |
| 63-148115 | 6/1988 | Japan .............................. | G01C 21/00 |

*Primary Examiner*—Tan Q. Nguyen

[57] ABSTRACT

A current position calculation system is provided for preventing accuracy in map matching from being degraded due to errors in an angular difference between road and vehicle directions. According to a previously determined vehicle current position and a relative displacement obtained on the basis of the vehicle direction and travelled distance, the vehicle current position is estimated as a virtual current position. A most probable latest current position on a road is determined on the basis of distances from the virtual current position to line segments representing part of roads, respectively, and an angular difference between each of the line segment directions and the vehicle direction. In addition, there are held a plurality of angular differences between road and vehicle directions which are differences between the vehicle directions of predetermined plural number of previously obtained positions, and the line segment directions at each of the previously obtained positions respectively. An averaged value of the plural number of angular differences between road and vehicle directions is obtained. A latest vehicle direction detected by a direction detecting means is modified on the basis of the averaged value. The map matching process is performed according to this modified vehicle direction.

5 Claims, 10 Drawing Sheets

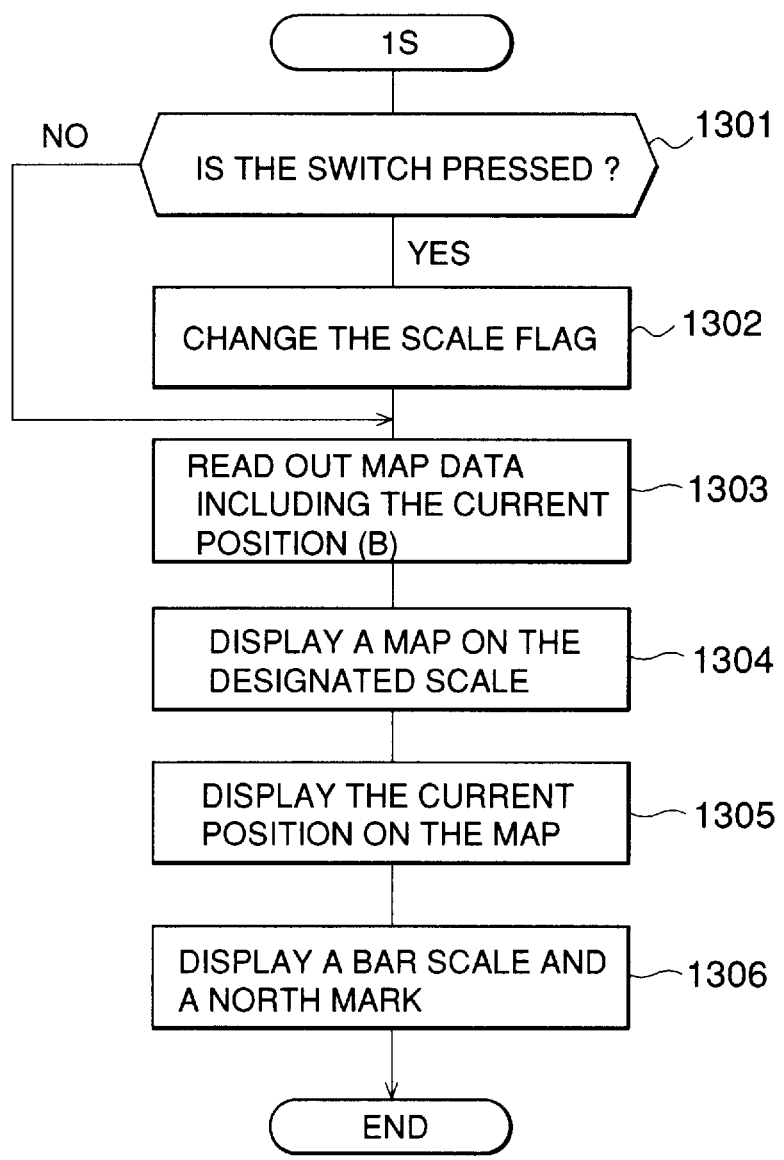

CURRENT POSITION CALCULATING SYSTEM FOR A VEHICLE HAVING A FUNCTION FOR CORRECTING A VEHICLE DIRECTION

BACKGROUND OF THE INVENTION

1. Field of the Invention

The present invention relates to a current position calculating system, which is installed on a mobile object such as a vehicle or the like, for measuring a travelled distance, a headed direction etc., of the vehicle to calculate a current position of the vehicle according to the measured values.

2. Description of Related Art

In a current position calculating system for calculating a current position of a vehicle driving on a road, a current position of the vehicle is usually calculated on the basis of a headed direction of the vehicle, measured by a direction sensor such as a gyrocompass, and a travelled distance of the vehicle measured by a vehicle velocity sensor or a distance sensor.

Generally, a travelled distance of a vehicle is obtained by measuring the number of revolutions of an output shaft of a transmission or a tire and multiplying the number of revolutions by a distance factor, which corresponds to a distance the vehicle travelled for each revolution of the tire.

In addition, there is known a technique in which in order to correct an error in the current position obtained from the vehicle headed direction and travelled distance as described above, the obtained current position of a vehicle is corrected so as to match with road data, what is called a map matching technique as disclosed in the official gazette of Japanese Patent Application Laid-Open (KOKAI) No. 63-148115. This map matching technique can enhance the accuracy in calculating the current position.

In the map matching as described above, a road direction which has been obtained from map data is also utilized in addition to the aforementioned vehicle headed direction. In other words, in the map matching process, a vehicle current position is estimated as a virtual current position on the basis of a relative displacement obtained from the previous vehicle current position, a current vehicle direction and travelled distance. Then, a most probable current position on a road is determined on the basis of a distance from the virtual current position to a line segment which represents part of a road and an angular difference between the line segment and vehicle directions. Therefore, the vehicle direction plays a significant role in determining a virtual current position and is also important for being compared with a line segment of a road.

However, there can be an error in the headed direction of a vehicle, namely a vehicle direction, due to magnetization of the vehicle itself or of the direction sensor. In addition, since a road map is approximated with line segments, the directions of the line segments on the map do not necessarily match the actual road directions. Therefore, so far, there has been a possibility that accuracy in map matching is degraded due to those errors in direction.

SUMMARY OF THE INVENTION

The present invention has for its object to offer a current position calculating system which can prevent accuracy in map matching from being degraded due to such errors in direction as described above.

In order to achieve the above object, a current position calculating system according to the present invention, which is installed on a vehicle and calculates a current position of the vehicle, comprises:

direction detecting means for successively detecting a vehicle direction which changes as the vehicle travels;

distance calculating means for successively calculating a travelled distance of the vehicle;

road data storing means for storing road data which contain line segments connected together;

map matching means for estimating a vehicle current position as a virtual current position according to a previously determined vehicle current position and a relative displacement with respect to the previously determined vehicle current position, the relative displacement having been obtained on the basis of the vehicle direction and the travelled distance, and for determining a most probable latest current position on a road on the basis of distances from the virtual current position to line segments of the road data respectively and angular differences between each of line segment directions and a vehicle direction; and direction modification means for holding a plurality of angular differences between road and vehicle directions, which are differences between the vehicle directions for a predetermined plural number of previously obtained positions having been determined by the map matching means, and the line segment directions at each of the previously obtained positions respectively, for obtaining an averaged value of the plural number of angular differences between road and vehicle directions, and for modifying a latest vehicle direction detected by the direction detecting means on the basis of the averaged value, wherein the map matching means performs a map matching process on the basis of the vehicle direction having been modified.

With the direction modification means in this system, it is possible to output, as a vehicle direction, the latest vehicle direction without any modifications thereto, immediately after starting up the system until the predetermined plural number of angular differences between road and vehicle directions are obtained.

The direction modification means can also output as a vehicle direction, the latest vehicle direction without any modifications thereto until another predetermined plural number of angular differences between road and vehicle directions are obtained, in the event where a new current position is determined to be on a road which is different from a road connecting ahead with the road on which the vehicle is estimated to be currently driving.

The modified vehicle direction is obtained by the direction modification means, for example, by subtracting an averaged value of the previously obtained plural number of angular differences between road and vehicle directions, from the latest vehicle direction detected by the direction detecting means.

In the present invention, not simply using the vehicle directions measured by a sensor, but by providing a direction modification means, it is possible to hold a plural number of angular differences between road and vehicle directions, which are differences between vehicle directions and line segment directions for a predetermined number of previously obtained positions determined by the map matching means respectively, to obtain an averaged value of the plural number of angular differences between road and vehicle directions, and to modify the latest vehicle direction on the basis of the averaged value. The accuracy in map matching can be enhanced by performing the map matching process on the basis of the modified vehicle direction. Particularly, when there are any errors in vehicle direction caused by being magnetized, or errors in road directions according to a road map, it is possible to modify such errors in angular difference between road and vehicle directions due to the aforementioned factors and accordingly, the vehicle direction can be adequately modified.

In addition, the averaged value of the previously obtained plural number of angular differences between road and vehicle directions is reflected on the latest vehicle direction, and thus it is possible to prevent accuracy in the map matching process from being degraded even in the event of using a vehicle direction measured in a transient state, such as when changing lanes or meandering.

BRIEF DESCRIPTION OF THE DRAWINGS

FIG. 10 is a flowchart showing a current position displaying process in the embodiment of the present invention.

DETAILED DESCRIPTION OF THE PREFERRED EMBODIMENT

Now, an embodiment of the present invention will be described in detail referring to the attached Figures.

Figure 1:
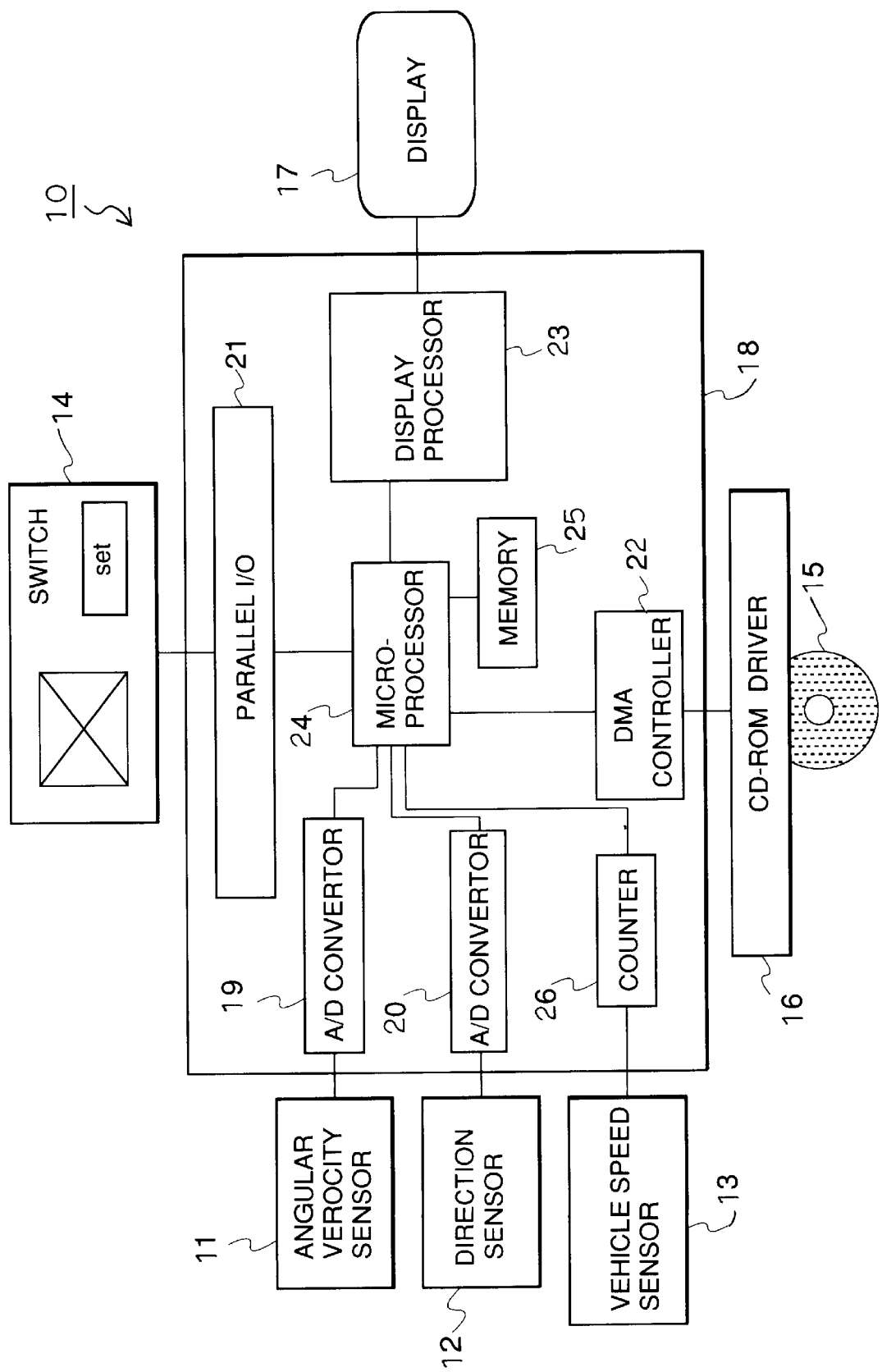
FIG. 1 is a block diagram showing a configuration of the current position calculating system in an embodiment of the present invention.

FIG. 1 is a block diagram showing a configuration of the current position calculating system in an embodiment of the present invention. As shown in FIG. 1, the current position calculating system 10 comprises an angular velocity sensor 11 for detecting a change in headed direction of a vehicle by detecting the yaw rate of the vehicle, a terrestrial magnetism sensor 12 for detecting the headed direction of the vehicle by detecting the terrestrial magnetism, and a vehicle velocity sensor 13 for outputting pulses at time intervals, the frequency of which is proportional to the rotational speed of a transmission output shaft of the vehicle.

The system 10 also comprises a display 17 which displays a map of the periphery of a current position, a mark indicating the current position, etc., a switch 14 which receives a command from a user (a driver) for switching the scale of the map on the display 17, a CD-ROM 15 for storing the digital map data, and a driver 16 for reading the map data from the CD-ROM 15. In addition, a controller 18 is also provided for controlling the operations of each of the aforementioned peripheral equipments. In the embodiment of the present invention, the aforementioned digital map data includes road data consisting of coordinates indicating the end points of a plurality of line segments, road width data indicating road widths, or a highway flag indicating that the road is a highway or an ordinary road.

The controller 18 comprises an A/D converter 19 for converting the (analog) signal from the angular velocity sensor 11 into a digital form, an A/D converter 20 for converting the (analog) signal from the terrestrial magnetism sensor 12 into a digital form, a counter 26 for counting the number of pulses outputted from the vehicle velocity sensor 13 per 0.1 second, a parallel I/O 21 for inputting whether or not the switch 14 is pressed, a DMA (Direct Memory Access) controller 22 for transmitting the map data read from the CD-ROM 15, and a displaying processor 23 for displaying a map image on the display 17.

Figure 2:
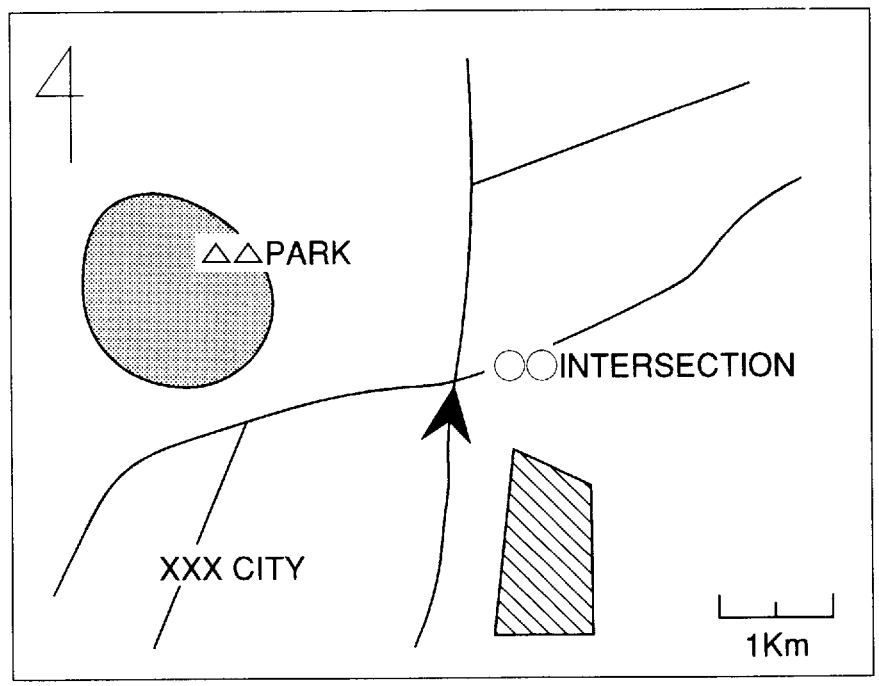
FIG. 2 is an illustration showing an example of display of a map and a current position thereon in the embodiment of the present invention.

Moreover, the controller 18 is provided with a microprocessor 24 and a memory 25. The microprocessor 24 receives the signals from the angular velocity sensor 11 obtained via the A/D converter 19, the signals from the terrestrial magnetism sensor 12 obtained via the A/D converter 20, the outputted number of pulses of the vehicle velocity sensor 13 counted by the counter 26, the information as to whether or not the switch 14 has been pressed, inputted via the parallel I/O 21, and the map data from the CD-ROM 15 obtained via the DMA controller 22, performs a process on the basis of the above signals, calculates a current position of the vehicle, and displays the result on the display 17 via the display processor 23. The vehicle position is indicated by an arrow or the like which is displayed on the already-displayed map on the display 17, as shown in FIG. 2, with the result that a user is able to know the current position of the vehicle on the map. The memory 25 includes a ROM that stores programs defining the contents of processes (which will be described below) for executing the aforementioned operations, and a RAM for use as a working area when the microprocessor 24 performs the processes.

Hereinafter, operations of the current position calculating system 10 with the aforementioned configuration will be explained.

Generally, there are found three processes as operations of the system 10 and those will be sequentially described, that is, a process for calculating a headed direction and a travelled distance of a vehicle, a process for determining a current position of the vehicle according to the calculated headed direction and the travelled distance, and a process for displaying the obtained position and direction of the vehicle.

Figure 3:
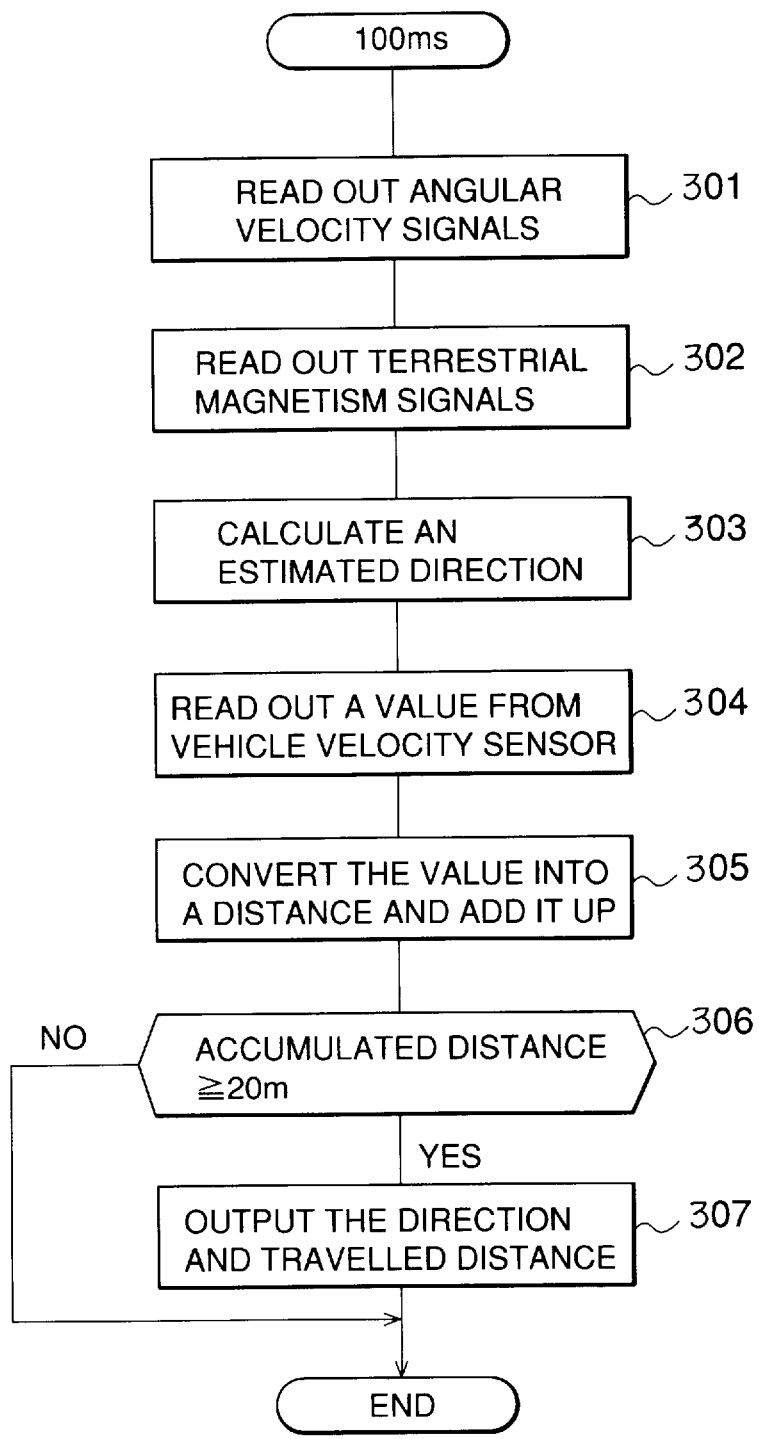
FIG. 3 is a flowchart showing a process for calculating a headed direction and a travelled distance of a vehicle in the embodiment of the present invention.

Referring to FIG. 3, a flow of the process for calculating a headed direction and a travelled distance of a vehicle will be described.

This is a routine of the microprocessor 24, which is executed at regular intervals, for example, every 100 ms.

In this routine, firstly, an output value of the angular velocity sensor 11 is read in from the A/D convertor 19 (step 301). Only a relative value (change) of the headed direction of the vehicle can be detected since the output value of the angular velocity sensor 11 is provided as a direction change. Therefore, secondly, an output value from the terrestrial magnetism sensor 12 is read in from the AID converter 20 (step 302) and an estimated direction of the vehicle is determined according to an absolute direction calculated from the output value of the terrestrial magnetism sensor 12 and the direction change (an angular velocity output) outputted from the angular velocity sensor 11 (step 303).

Since an error produced in the angular velocity sensor is likely to be large if the vehicle velocity remains low for a long time for example, the determination of the direction is performed by means of utilizing only the direction of the terrestrial magnetism sensor in the event where the vehicle velocity remains low for more than a predetermined period of time.

Next, the number of pulses outputted from the vehicle velocity sensor 13 is counted every 0.1 second by the counter 26, and the counted value is read in (step 304). The travelled distance for 0.1 second is obtained by multiplying this read-in value by a distance factor (step 305).

Next, the travelled distance value per 0.1 second which has been obtained as described above, is added to the previously obtained value of the travelled distance, and it is checked whether or not the sum of the travelled distance has reached 20 meters (step 306). If the accumulated value is less than 20 meters ("No" in step 306), the current process ends and another process starts.

As a result of the calculation of the travelled distance, if the accumulated travelled distance has reached a predetermined value, for example, 20 meters ("Yes" in step 306), the headed direction and the travelled distance (20 meters) at that point in time are outputted (step 307). Additionally, in step 307, the accumulated distance is initialized and another accumulation of the travelled distance is started.

As a second process, there will be described the process for calculating a virtual current position of the vehicle and for obtaining possible points of the vehicle on the basis of a calculated virtual current position. It will also be explained how to cope with errors in direction in the embodiment of the present invention.

Figure 4:
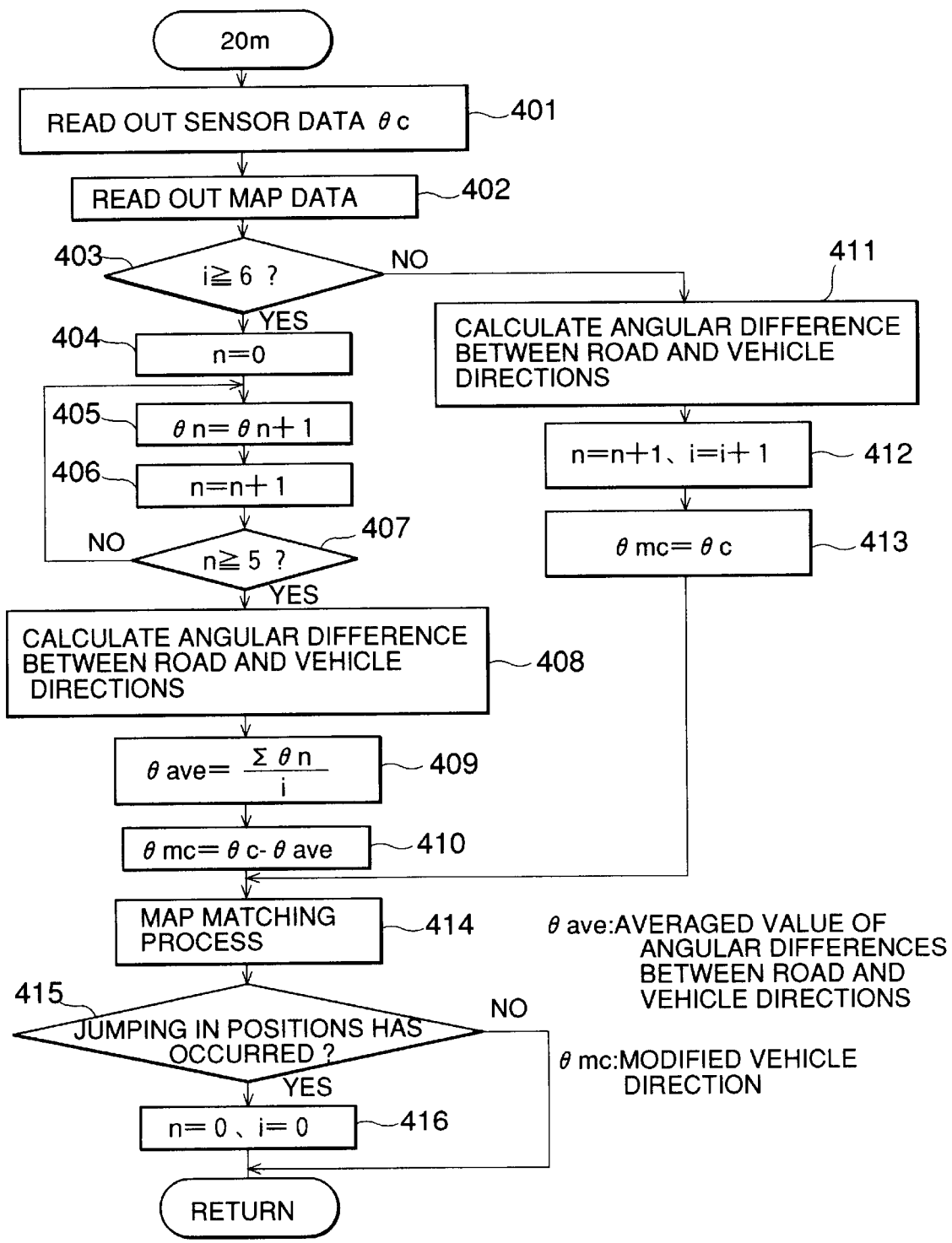
FIG. 4 is a flowchart showing a main process which is executed every time when the vehicle has travelled a predetermined distance in the embodiment of the present invention.

Referring to FIG. 4, there is shown a flow of the process.

This process is triggered by receiving the output of the headed direction and the travelled distance from the process shown in FIG. 3, and executed as a routine of the microprocessor 24. In other words, this process is started up every time a vehicle travels 20 meters.

In this step, firstly, a current vehicle direction $\theta c$ is read in out of the data outputted from the previous step 307 (step 401). Secondly, map data of the periphery of the current position is read out from the CD-ROM (step 402).

Then, it is checked whether the value of a counter i for modifying direction is 6 or more (step 403). The counter i is initialized to zero at the time of starting up the system and after that it is incremented every 20 meters until it reaches 6 (step 412 which will be described below).

If the counter i is less than 6, an angular difference On between road and vehicle directions is calculated (step 411). Here, n represents a counter for the angular difference between road and vehicle directions for identifying the angular differences up to the number of 6 and it is also initialized to zero at the time of starting up the system. The angular difference On between road and vehicle directions can be obtained with the following formula:

$$\theta n = \theta cp - \phi \qquad (1)$$

Here, $\phi$ represents a road direction at the current position obtained by the matching process at the previous time, 20 meters before, and $\theta cp$ represents a vehicle direction at the same time.

In the case where the angular difference between road and vehicle directions is $\theta 0$, that is, there is no previous data at the time of starting up, the value 0 (zero) is used. The reason the previous data is used is that the current road direction is decided after the current position is determined in the subsequent map matching process (step 414).

Next, the counter n and i are respectively incremented (plus 1) (step 412). Then, the current vehicle direction $\theta c$ is set as the modified current vehicle direction $\theta mc$ (step 413). This is because, in the embodiment of the present invention, the past 6 number of direction data are averaged to be used and thus at this point of time, the averaged value has not been obtained yet. Subsequently, it proceeds to the next step, a map matching process of step 414.

After the process passes step 411 five times for every 20 meters travelled, the past 6 number of angular differences between road and vehicle directions $\theta 0$ to $\theta 5$ are obtained, and in step 412, i becomes equal to 6. As a result, in the next step 403 after travelling 20 meters, i becomes 6 or more and thus, the process proceeds to step 404.

In step 404, n is initialized to zero and in the subsequent loop of steps 405 to 407, the value of $\theta n+i$ is shifted to the value of $\theta n$. That is, the value of $\theta 1$ is shifted to $\theta 0$, the value of $\theta 2$ is shifted to $\theta 1$, the value of $\theta 3$ is shifted to $\theta 2$, the value of $\theta 4$ is shifted to $\theta 3$, and the value of $\theta 5$ is shifted to $\theta 4$. When n reaches 5 by incrementing in step 406 (step 407), the process goes out of this loop. The newly obtained $\theta 5$ is the latest angular difference On between road and vehicle directions and it is calculated in step 408. Similar to step 411, the road direction $\phi$ represents a road direction at the current position which has been obtained in the previous map matching process 20 meters before, and the vehicle direction $\theta c$ represents the vehicle direction at the same time 20 meters before.

Then, the past 6 angular differences between road and vehicle directions $\theta 0$ to $\theta 5$ are averaged to obtain $\theta ave$ (step 409). Next, a modified vehicle direction $\theta mc$ is obtained in the following formula (2) (step 410).

$$\theta mc = \theta c - \theta ave \qquad (2)$$

With the formula above, it is possible to modify a vehicle direction $\theta c$ with respect to a road direction. As a result, in the event where an error inherent to the vehicle direction $\theta c$ is produced due to magnetization of the vehicle or the like, that error is included in $\theta ave$. Thus, the error can be cancelled by subtracting $\theta ave$ from $\theta c$. In addition, if an error has been produced in a road direction on the map it is possible to cancel the error. In the latter case, the vehicle direction $\theta c$ is modified with respect to the road direction regardless of an error in the vehicle direction $\theta c$, but it is not a problem as long as the road direction displayed on the map is consistent with the vehicle direction.

The map matching process is conducted with the vehicle direction $\theta mc$ obtained as described above (step 414). The map matching process will be described in detail below, referring to FIG. 5.

Next, it is checked whether or not there has been a jumping in current positions (step 415). The jumping in current positions means that a current position on the road presently being driven on has jumped onto a road other than the roads continuing ahead from the present road. In the event of such jumping in current positions, the values of n and i are initialized to zero (step 416). This is because a process which is similar to the one immediately after starting up the system is required since the previously obtained angular differences $\theta n$ between road and vehicle directions have not been prepared for the new road, just after the jumping in positions. If the jumping in current positions has not occurred, the process ends without going through step 416.

Figure 5:
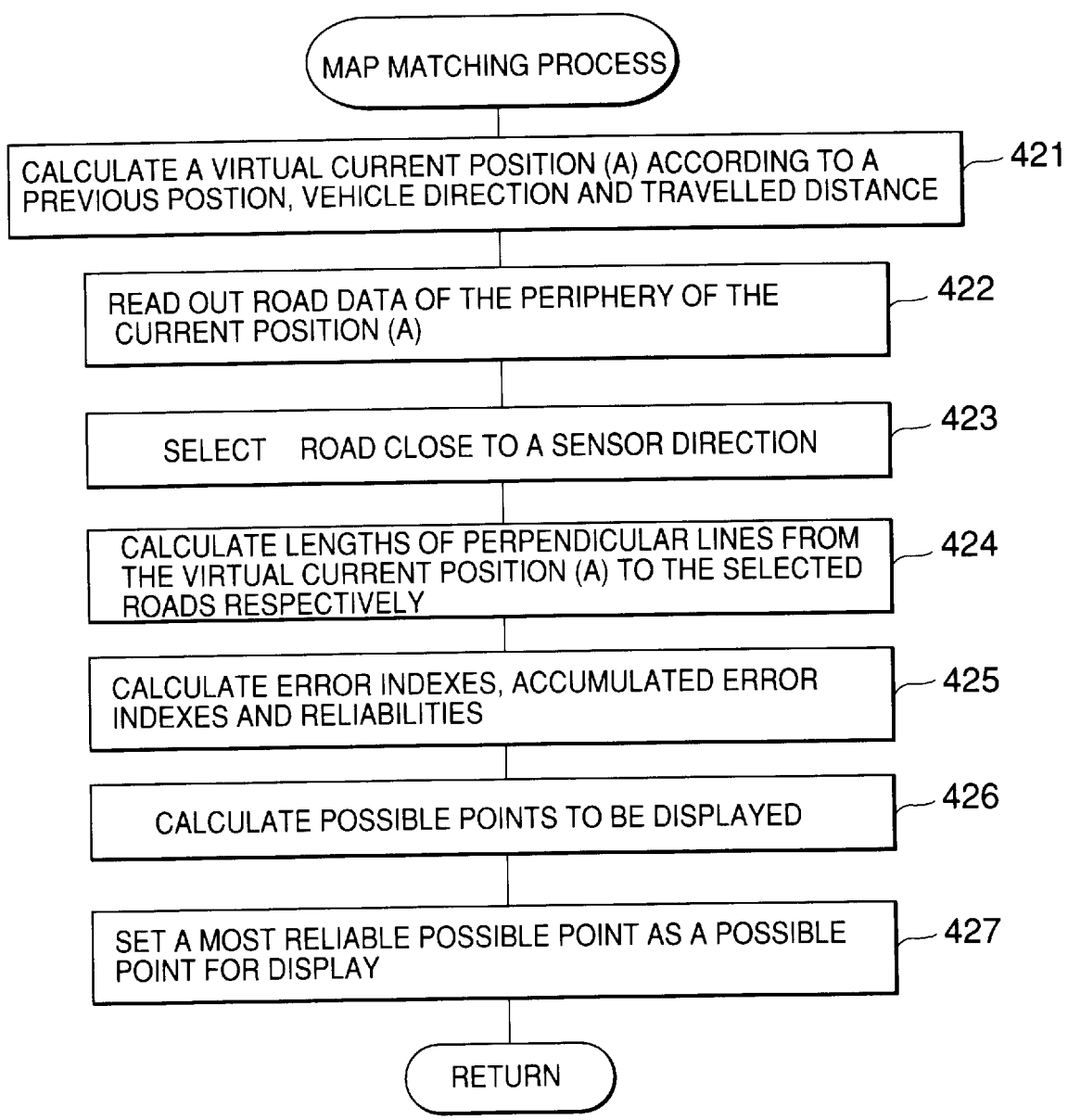
FIG. 5 is a flowchart showing a detailed process of one step (map matching process) shown in FIG. 4.

In FIG. 5, a map matching process is shown in detail.

In the map matching process, firstly, amounts of the vehicle movement in the latitudinal direction and in the longitudinal direction are respectively obtained, and the amounts of movement in the respective directions are added to the corresponding values indicating the possible points of the vehicle current position obtained in the previous process, in order to determine a virtual current position (A) where the vehicle is estimated to exist (step 421). The details of the possible points will be described below.

If there is no previously obtained possible points, for example, just after starting the equipment, a predetermined position is used as a previously obtained possible points to determine the virtual current position (A).

Next, a map of the periphery of the obtained virtual current position (A) is read out from the CD-ROM 15, via the driver 16 and the DMA controller 22 (step 422). At this time, line segments or any line segments connecting thereto, representing roads within a distance searching range D are selected with respect to the possible points positioned on the roads, which have been used to obtain the virtual current position (A). In this case, the distance search range D may be variable depending on the reliability of the possible points used for obtaining the virtual current position. That is, for the virtual current position obtained from the possible points which are highly reliable, line segments are selected from a narrower range, and for the virtual current position obtained from the possible points with low reliability, line segments are selected from a wider range. In the case of low reliability of the possible points, the accuracy of the previously obtained current position is not reliable, either. Therefore, it is appropriate to search over a wider range for roads when obtaining an accurate current position in such a manner that the distance search range is set to be variable depending on the reliability.

Figure 6:
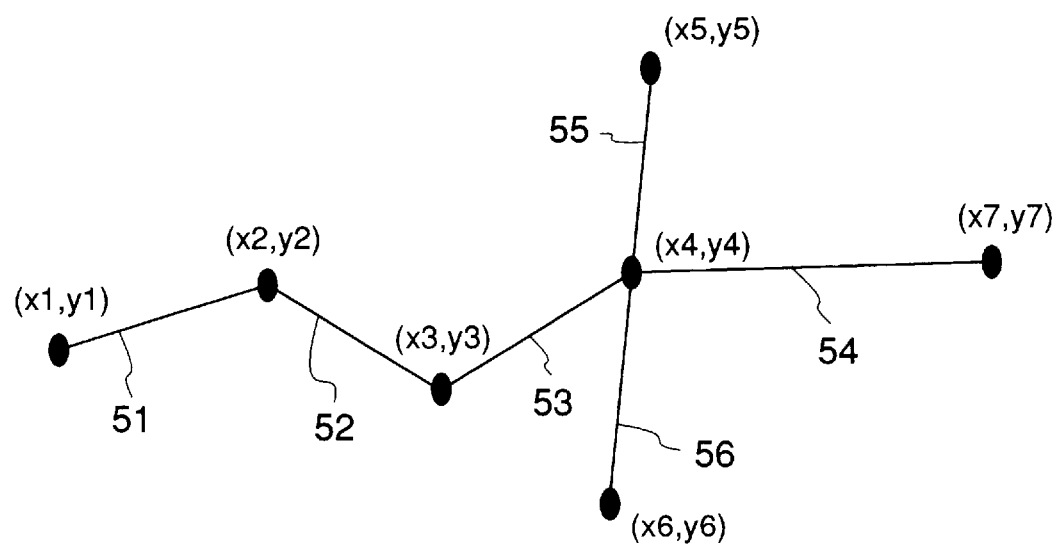
FIG. 6 is an illustration for explaining an example of road data in the embodiment of the present invention.

As describe above, in the embodiment of the present invention, road data can be approximated by a plurality of line segments, e.g., line segments 51 to 56 as shown in FIG. 6, each of which is represented by a pair of coordinates, starting point and terminal point of the line segment. For example, line segment 53 is represented by the starting point (x3, y3) and the terminal point (x4, y4).

Next, only the line segments, whose directions are within the predetermined angular range with respect to the given headed direction, are extracted from the line segments outputted in step 422 (step 423). In addition, perpendicular lines are drawn from the virtual current position (A) to all n number of extracted line segments, and the lengths of perpendicular lines L(n), namely the distance from the virtual current position (A) to the respective line segments are obtained (step 424).

Next, those lengths of the perpendicular lines are used for calculating an error index value, θc(n) defined in the following formula, for each line segment extracted in step 423 (step 425).

$$ec(n)=\alpha \times |\theta car-\theta(n)|+\beta \times |L(n)|$$

Here, θcar is defined as a vehicle direction at the virtual current position (A), θ(n) is defined as a line segment direction, L (n) is defined as a distance from the virtual current position (A) to the line segment, namely the aforementioned lengths of perpendicular lines, and α and β are defined as weighting factors.

The values of these weighting factors may be varied depending on which is more important in the event of selecting a road where the current position exists, namely the difference between the headed direction and the road direction or the difference between the current position and the road position. For example, if a road, whose direction is close to the headed direction, is to be selected, the value of α should be made larger.

Figure 7:
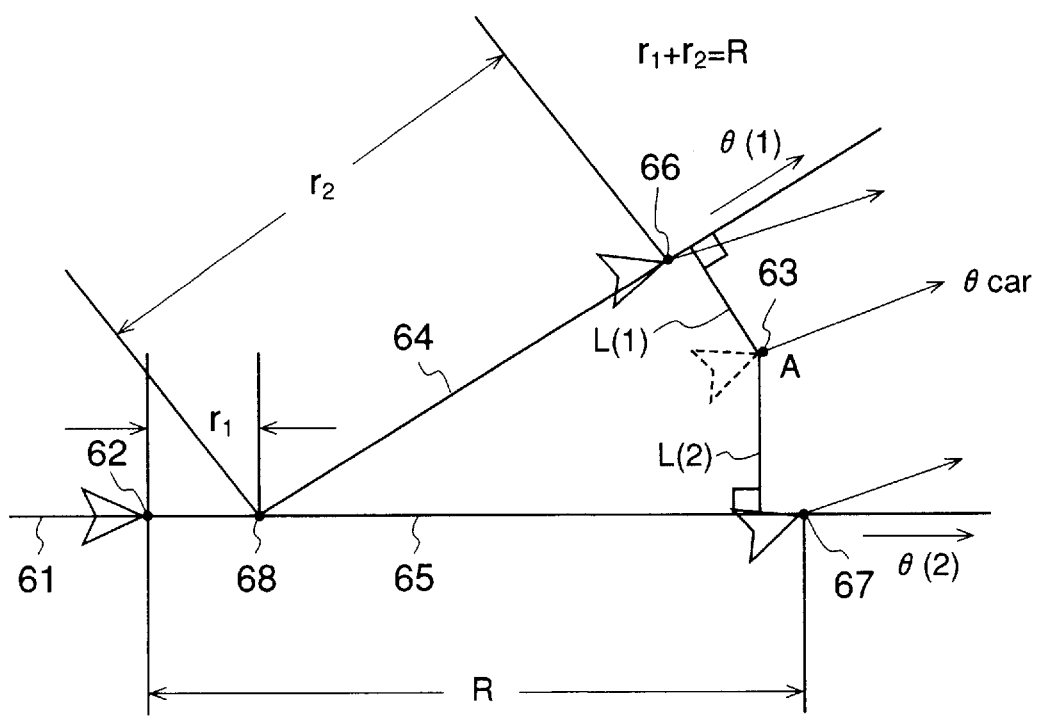
FIG. 7 is an illustration for explaining line segments corresponding to roads, a virtual current position and possible points for the virtual current position.

Here, the possible points will be further explained. At an initial state, such as immediately after starting up the system, a virtual current position (A) is uniquely decided, for example by inputting predetermined information via the switch 14 by a user (a driver) and the virtual current position can be positioned on a line segment corresponding to a road. However, after a certain drive, it may occur that the virtual current position (A) does not exist on a line segment corresponding to a road, due to an error in a sensor such as a gyrocompass. For example, as shown in FIG. 7, in the event where a road branches, namely, two line segments, 64 and 65 appear from a node 68 on the line segment 61 corresponding to a road, in many cases it cannot be determined on which the vehicle exists.

Therefore, in the embodiment of the present invention, a configuration is provided for coping with the above case. The predetermined points which exist on two possible line segments are defined as possible points, and the current positions and error indexes thereof, as well as their accumulated error indexes which will be explained below, are stored respectively in predetermined areas of the RAM in the memory 25. For ease of explanation, hereinafter it will be defined that one or more new possible points are generated from a unique possible point, as long as there is no particular indication that the possible points are plural.

Here, a calculation for the reliability will be explained. According to the error index ec (n) calculated in advance and the accumulated error index es relating to the possible points obtained in the previous process, an accumulated error index es (n) in the current process defined in the following formula is calculated.

$$es(n)=(1-k)\times es+k\times ec(n) \qquad (4)$$

Here, k is a weighted factor which is more than 0 and less than 1. The accumulated error index es (n) represents an influence of the error index calculated previously, on the error index calculated in the current process.

Moreover, on the basis of the accumulated error index es (n) which has been calculated, reliability trst (n) defined in the following formula is calculated.

$$trst(n)=100/(1+es(n)) \qquad (5)$$

Obviously, from the above formula, as accumulated error index es (n) becomes larger, reliability trst (n) decrease towards 0 (zero). On the other hand, as accumulated error index becomes smaller, trst (n) increases towards 100.

With the above explained process, it is possible to obtain reliability trst (n) relating to the n number of line segments, from a current position A to a number of certain possible points, which exist within a predetermined range.

Subsequent to step 425, a point which is away from a given possible point along a corresponding line segment by the length which is equal to the vehicle travelled distance R, is defined as a new possible point C(n) (step 426). Therefore, if there are n line segments, on which a certain possible point is located or which is connecting thereto, whose angular difference between line segment and vehicle directions is a predetermined value or less, n new possible points C(n) are generated.

Finally, the most reliable possible point is selected as a possible point for display out of the possible points whose reliabilities have been obtained in steps 425 and 426, and data of the possible point for display is outputted (step 427). Specifically, the most reliable possible point C is determined as a possible point for display CD, namely a possible point for being displayed on the display 17, and the location, accumulated error index, and reliability thereof are stored in a predetermined area in RAM of the memory 25, as well as the locations, accumulated error indexes, and reliabilities of other possible points besides those of the possible point for display.

Hereinafter, an operation of map matching will be discussed with an example on a specific road. For example as shown in FIG. 7, it is assumed that the position of point 63 represents a current position A with respect to a possible point 62 which is positioned on line segment 61. In this situation, line segments, such as line segments 64 and 65, are selected which are connected to line segment 61 where possible point 62 is positioned and the angular differences between line segments and vehicle direction is respectively less than a predetermined value. Distances L(1) and L(2), from the current position A to line segments 64 and 65 are respectively calculated, as well as related error indexes, accumulated error indexes and reliabilities are obtained on the basis of those above calculated distances, angles θ(1), θ(2) and the vehicle direction θcar, etc., of the line segments 64 and 65. In addition, on the basis of vehicle travelled distance R obtained in step 307 in FIG. 3, positions away from the possible point 62 by the distance corresponding to the vehicle travelled distance R along either line segments 61 and 64 or line segments 61 and 65, are calculated and determined as possible points 66 and 67 respectively.

Figure 8:
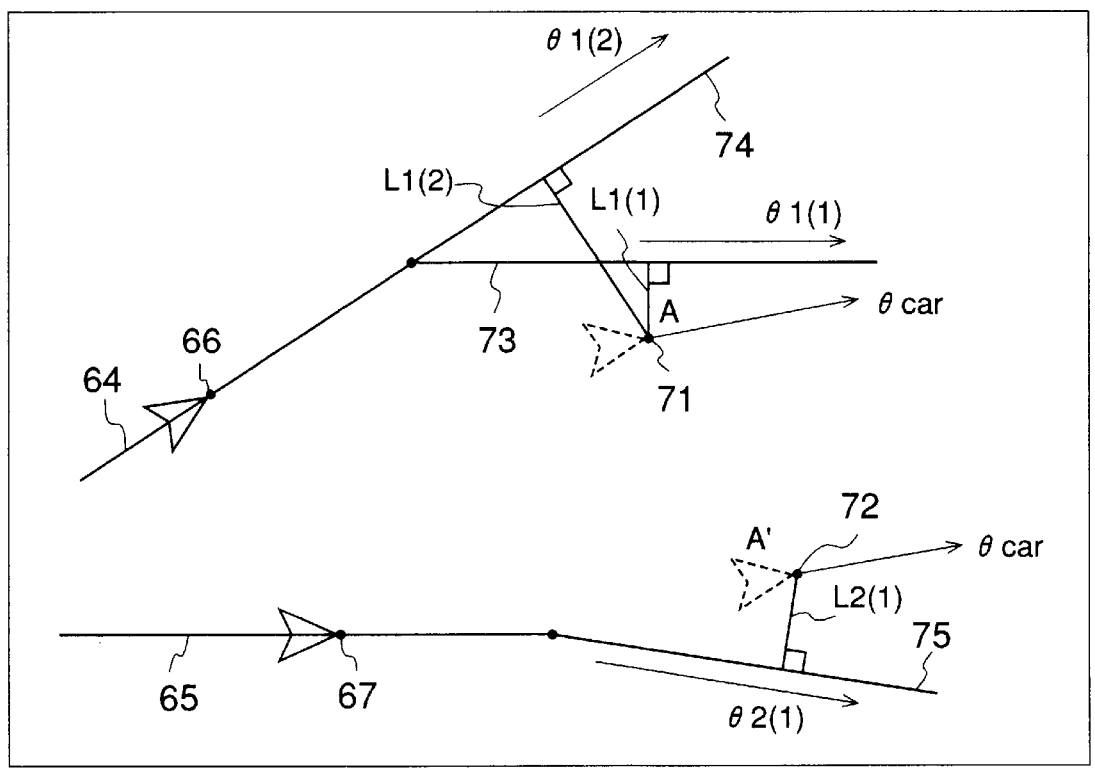
FIG. 8 is an illustration for explaining line segments corresponding to roads, a virtual current position and possible points for the virtual current position.

Furthermore, as shown in FIG. 8, it is assumed that the position of point 71 represents a new current position A with respect to a possible point 66 which is positioned on line segment 64, while, it is assumed that the position of point 72 represents a new current position A' with respect to the possible point 67 on line segment 65. In this situation, according to the current position A, line segments, such as line segments 73 and 74, are selected which are connected to line segment 64 and an angular difference between the line segments and vehicle directions are respectively less than a predetermined value. At the same time, according to the current position A', line segment 75 is selected which is connected to line segment 65, and an angular difference between line segment and vehicle directions is less than a predetermined value. Subsequently, distances L(1) and L(2), from the current position A to line segments 73 and 74 respectively, are calculated, as well as distance L2(1), from the current position A' to line segment 75. Furthermore, a related error indexes, accumulated error indexes and reliabilities are obtained on the basis of the distances, the angles θ1(1), θ(2) of line segments 73 and 74 respectively and vehicle direction θmc, calculated with respect to the current position A, and also a related error index, accumulated error index and reliability are obtained on the basis of the distance, the angle θ2(1) of line segment 75 and vehicle direction θmc calculated with respect to the current position A'.

Figure 9:
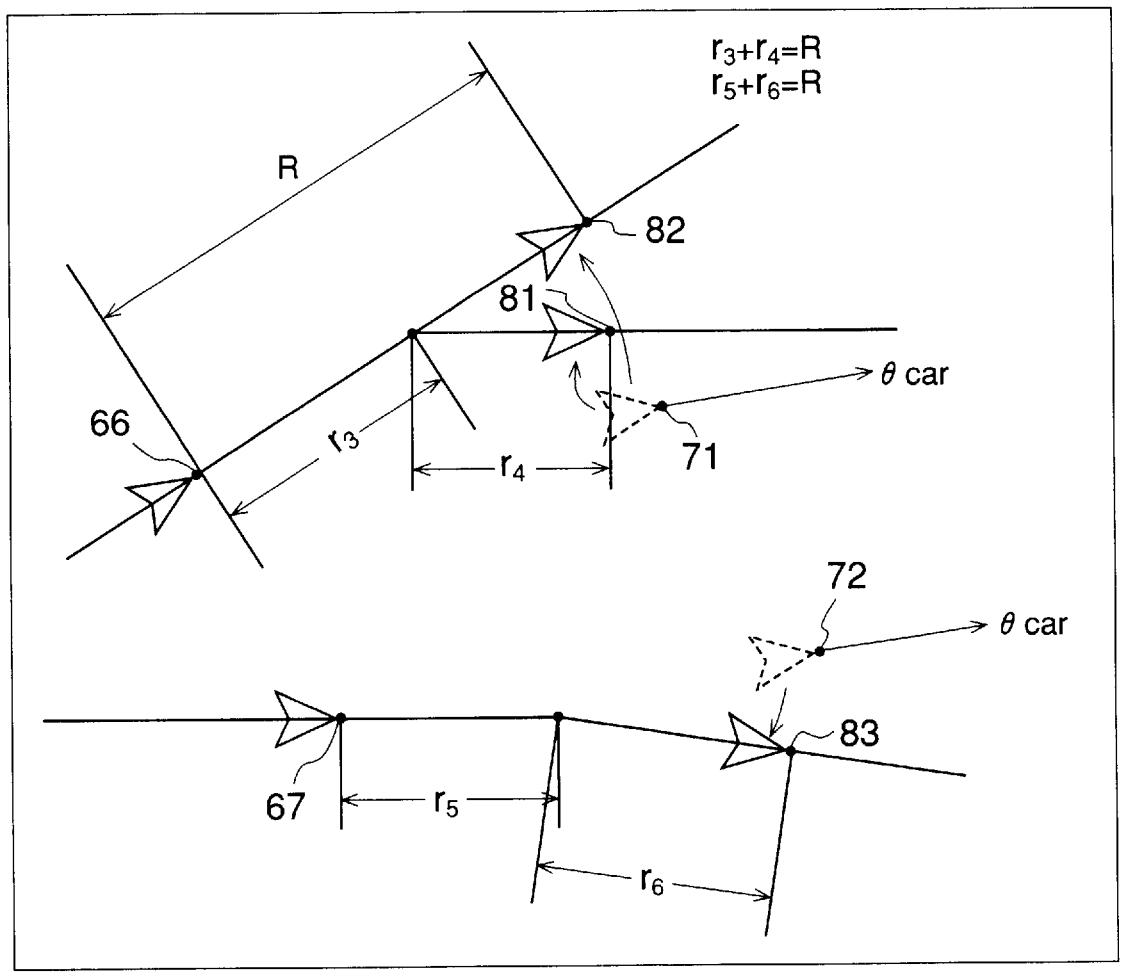
FIG. 9 is an illustration for explaining line segments corresponding to roads, a virtual current position and possible points for the virtual current position.

On the basis of the vehicle travelled distance R obtained in step 307 in FIG. 3, a position which is away from possible point 66 by the distance corresponding to the vehicle travelled distance R either along line segments 64 and 73 or along line segments 64 and 74 is calculated, as well as a position which is away from possible point 67 by the distance corresponding to the vehicle travelled distance R along line segments 65 and 75. As a result, the points at above identified positions are determined as new possible points, respectively. In FIG. 9, there are shown the possible points 81, 82 and 83 obtained as described above.

The possible point for display obtained in step 427 in FIG. 5 is displayed on the display 17 according to the process of the flowchart shown in FIG. 10. This process is a routine of the microprocessor 24, being started up and executed every second.

At first, it is determined whether or not the switch 14 has been pressed for instructing to change the map scale according to the contents of parallel I/O 21 (step 1301). If the switch has been pressed ("Yes" in step 1301), a predetermined scale flag is set corresponding to the instruction (step 1302).

Next, the data indicating the position and direction of the possible point for display is read out from a predetermined area in the RAM of the memory 25 (step 1303), and the map on the scale which has been switched according to the contents of the scale flag in step 1302 is displayed on the display 17, for example, as shown in FIG. 2 (step 1304).

The position and the headed direction (the modified vehicle direction θmc) of the possible point for display are displayed, for example, with an arrow sign "↑" on the already-displayed map, as shown in FIG. 2 (step 1305). Finally, a mark indicating the north direction and a ruler or bar scale for representing a distance corresponding to the scale are overlaid on the map as shown in FIG. 2 (step 1306).

In this embodiment, an arrow sign is used, as described above, to indicate the vehicle position and direction. However, the method of indicating the vehicle position and direction can be decided optionally, as long as the position and the headed direction are definitely indicated. The mark indicating the north direction, etc., can be similarly varied.

According to the embodiment of the present invention, it is possible to prevent accuracy of map matching from being degraded due to an error in an angular difference between road and vehicle directions, by use of a vehicle direction which has been modified with an obtained value in such a manner that an averaged value of previously obtained plural number of angular differences between road and vehicle directions is subtracted from a latest angular difference between road and vehicle directions, not by a simple use of the vehicle direction as it is at every measured time.

In the meantime, the term "means" in the present specification and the attached claims is not necessarily a physical means and it may imply that functions of each means can be performed with software. Moreover a function of means may be performed by two or more physical means, or two or more functions of means may be performed by one physical means. Also, the number of previous angular differences between road and vehicle directions previously obtained for calculating an average value thereof is not necessarily limited to six.

According to the present invention, it is possible to provide a current position calculating system which can prevent accuracy in map matching from being degraded due to an error in angular difference between road and vehicle directions, in such a manner that the averaged value of the previously obtained plural number of angular differences between road and vehicle directions is reflected on the latest angular difference between road and vehicle directions.

What is claimed is:

1. A current position calculating system being installed on a vehicle for calculating a current position of the vehicle, comprising:

direction detecting means for successively detecting a vehicle direction which changes as the vehicle travels;

distance calculating means for successively calculating a travelled distance of the vehicle;

road data storing means for storing road data which contain line segments connected together;

map matching means for estimating a vehicle current position as a virtual current position according to a previously determined vehicle current position and a relative displacement with respect to said previously determined vehicle current position, said relative displacement having been obtained on the basis of said vehicle direction and said travelled distance, and for determining a most probable latest current position on a road on the basis of distances from the virtual current position to line segments of said road data respectively and angular differences between each of line segment directions and a vehicle direction; and direction modification means for holding a plural number of angular differences between road and vehicle directions, which are differences between the vehicle directions for a predetermined plural number of previously obtained positions having been determined by the map matching means, and said line segment directions at each of the previously obtained positions respectively, for obtaining an averaged value of the previously obtained plural number of angular differences between road and vehicle directions, and for modifying a latest vehicle direction detected by said direction detecting means on the basis of the averaged value, wherein said map matching means performs a map matching process on the basis of the vehicle direction having been modified.

2. A current position calculating system as defined in claim 1, wherein said direction modification means outputs as a vehicle direction a latest vehicle direction without any modifications thereof, immediately after starting up the system until the predetermined plural number of angular differences between road and vehicle directions are obtained.

3. A current position calculating system as defined in claim 2, wherein said direction modification means outputs as a vehicle direction the latest vehicle direction without any modifications thereof until another predetermined plural number of angular differences between road and vehicle directions are obtained, in the event where a new current position is determined to be on a road which is different from a road connecting ahead with the road on which the vehicle is estimated to be currently driving.

4. A current position calculating system as defined in claim 1, wherein said direction modification means outputs as a vehicle direction the latest vehicle direction without any modifications thereof until another predetermined plural number of angular differences between road and vehicle directions are obtained, in the event where a new current position is determined to be on a road which is different from a road connecting ahead with the road on which the vehicle is estimated to be currently driving.

5. A current position calculating system as defined in claim 1, wherein said direction modification means obtains the vehicle direction having been modified, by subtracting an averaged value of the previously obtained plural number of angular differences between road and vehicle directions, from the latest vehicle direction detected by the direction detecting means.

* * * * *

UNITED STATES PATENT AND TRADEMARK OFFICE
CERTIFICATE OF CORRECTION

PATENT NO. : 5,839,087

DATED : November 17, 1998

INVENTOR(S) : Sato Hiroyuki

It is certified that error appears in the above-identified patent and that said Letters Patent is hereby corrected as shown below:

On the title page, item [73]

Assignee: Xanavi Informatics Corporation
Zama-shi, Kanagawa-ken, Japan

Signed and Sealed this

Twenty-first Day of September, 1999

Attest:

Attesting Officer

Q. TODD DICKINSON

Acting Commissioner of Patents and Trademarks